United States Patent
Cheng et al.

(10) Patent No.: US 6,721,026 B2
(45) Date of Patent: Apr. 13, 2004

(54) STRUCTURE OF IN-PLANE SWITCHING MODE LCD WITH IMPROVED APERTURE RATIO OF PIXEL REGION AND PROCESS FOR PRODUCING SAME

(75) Inventors: Jia-Shyong Cheng, Hsinchu (TW); Tean-Sen Jen, Chiai (TW)

(73) Assignee: Hannstar Display Corporation (TW)

( * ) Notice: Subject to any disclaimer, the term of this patent is extended or adjusted under 35 U.S.C. 154(b) by 260 days.

(21) Appl. No.: 09/846,462

(22) Filed: May 1, 2001

(65) Prior Publication Data

US 2001/0040662 A1 Nov. 15, 2001

(30) Foreign Application Priority Data

May 2, 2000 (TW) ........................................ 89108342 A (51) Int. Cl.[7] ............................................. G02F 1/1333
(52) U.S. Cl. ........................ 349/141; 349/138; 349/147
(58) Field of Search .................................. 349/138, 141, 349/147

(56) References Cited

U.S. PATENT DOCUMENTS

| | | | | |
|---|---|---|---|---|
| 5,907,379 A | * | 5/1999 | Kim et al. | 349/141 |
| 5,917,564 A | * | 6/1999 | Kim et al. | 349/46 |
| 6,130,729 A | * | 10/2000 | Oh et al. | 349/43 |
| 6,177,970 B1 | * | 1/2001 | Kim | 349/43 |
| 6,469,769 B2 | * | 10/2002 | Ozaki | 349/187 |
| 6,486,934 B2 | * | 11/2002 | Yun et al. | 349/141 |

* cited by examiner

Primary Examiner—Tarifur R. Chowdhury
Assistant Examiner—Andrew Schechter
(74) Attorney, Agent, or Firm—Peter F. Corless; Steven M. Jensen; Edwards & Angell, LLP (57) ABSTRACT

A process for forming an in-plane switching mode liquid crystal display (IPS-LCD), which defines pixel portions of the common and data electrodes by the same photo-masking and lithography procedure, is disclosed. Accordingly, the misalignment can be avoid. An in-plane switching mode liquid crystal display (IPS-LCD) is also disclosed. The IPS-LCD includes a storage capacitor consisting of storage-capacitor portions of the common and data electrode structures, which is disposed outside the pixel region so as to enhance the aperture ratio of the pixel region.

12 Claims, 10 Drawing Sheets

STRUCTURE OF IN-PLANE SWITCHING MODE LCD WITH IMPROVED APERTURE RATIO OF PIXEL REGION AND PROCESS FOR PRODUCING SAME

FIELD OF THE INVENTION

The present invention relates to a structure of an in-plane switching mode liquid crystal display (LCD), and more particularly to a structure of an in-plane switching mode TFTLCD with an improved aperture ratio of the pixel region thereof. The present invention further relates to a simplified process for forming an in-plane switching mode LCD.

BACKGROUND OF THE INVENTION

Figure 1A:
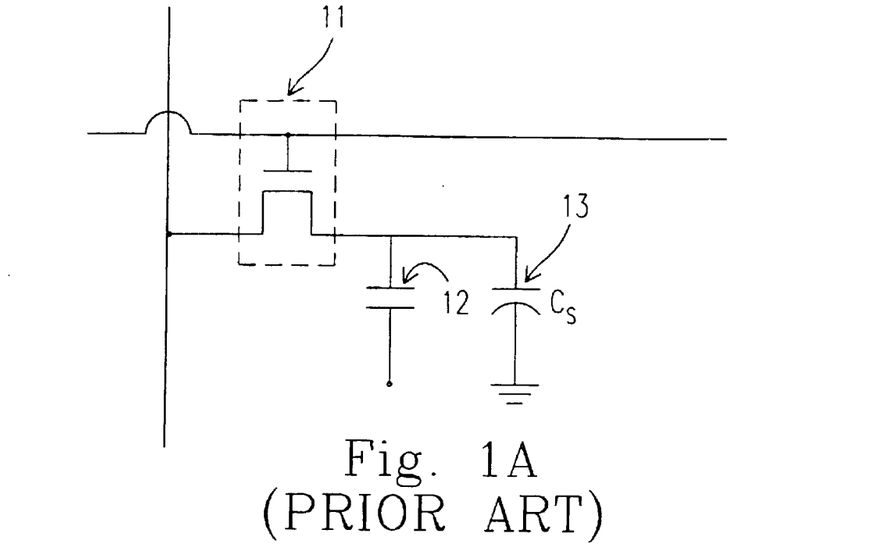
FIG. 1A is a schematic circuit diagram showing unit pixel region in a liquid crystal display.

With the development and improvement on LCD-related technology, a liquid crystal display tends to substitute for a conventional cathode-ray tube display to become a main stream. Please refer to FIG. 1A which is a schematic circuit diagram of a unit pixel region in a liquid crystal display. In the unit pixel region, a thin film transistor (TFT) 11 functioning as a switching unit, a displaying unit 12 and a storage capacitor 13 are included. Concerning the structure of the display unit 12, it can be classified currently into two types, i.e. a twisted nematic mode LCD (TN-LCD), and an in-plane switching mode LCD (IPS-LCD).

Figure 1B:
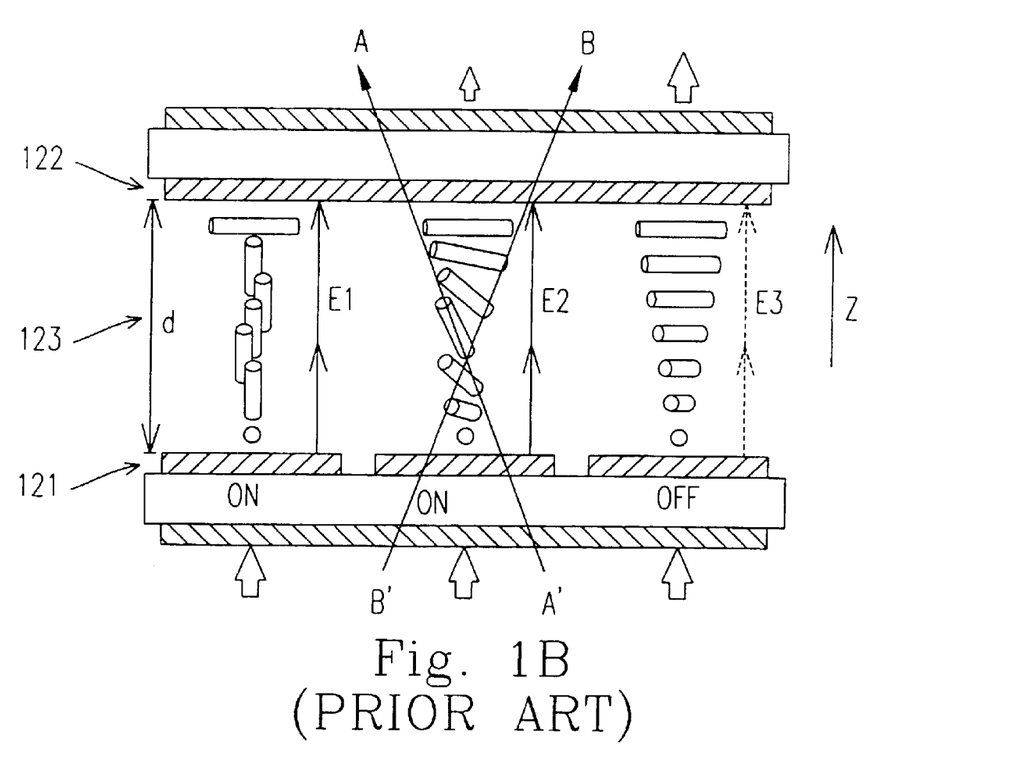
FIGS. 1B and 1C are schematic diagrams showing structures of displaying units of a TN-LCD and an IPS-LCD, respectively.

A general structure of the display unit 12 of a TN-LCD is schematically shown in FIG. 1B. The display unit 12 includes a data electrode 121 and a common electrode 122 which are spaced with a cell gap d, and liquid crystal (LC) molecules 123 sandwiched between the electrodes 121 and 122. By providing a potential difference between the data electrode 121 and common electrode 122, the LC molecules 123 will tend to stand, and the standing angles of the LC molecules relative to Z-axis depend on the electric field applied thereonto. For illustration, three kinds of electric fields E1, E2 and E3 are applied in FIG. 1B to show the changes of the standing angles of LC molecules wherein E1>E2>E3=0. For different standing angles, the light transmittance varies, thereby controlling the brightness of individual pixels. The rotation manner of the LC molecules in such a TN-LCD result in a change of light transmittance with different viewing angles. For example, the light transmittance in the A–A' direction and that in the B–B' direction are different because their multiple refraction in different ways. Therefore, the viewing range of such an LCD, especially a large-size LCD, for seeing a clear image is confined.

Figure 1C:
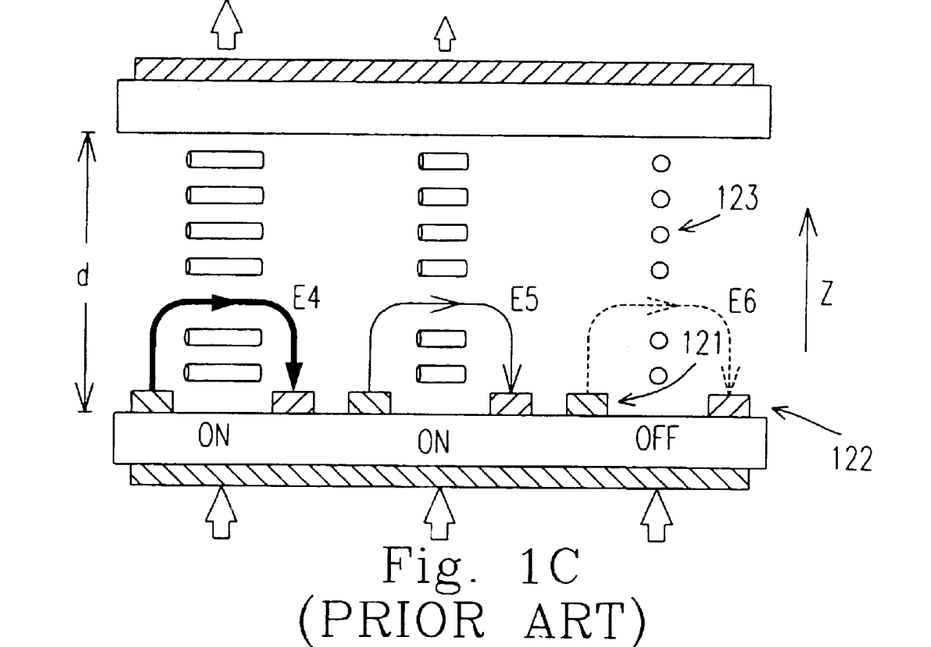

A general structure of the display unit 12 of an IPS-LCD is schematically shown in FIG. 1C. As shown, the data electrode 121 and the common electrode 122 are arranged at the same side of LC molecules 123. Similar to the operations for a TN-LCD described above, a potential difference is provided between the data electrode 121 and common electrode 122 to rotate the LC molecules 123. According to the in-plane switching mode, the LC molecules 123 will rotate about the Z-axis to a degree depending on the electric field applied thereonto. For illustration, three kinds of electric fields E4, E5 and E6 are applied in FIG. 1C to show the changes of the rotating angles of LC molecules wherein E4>E5>E6=0. For different rotating angles, the light transmittance varies, thereby controlling the brightness of individual pixels. The rotation manner of the LC molecules in such an IPS-LCD will not result in any significant change of light transmittance with different viewing angles. Therefore, it has an advantage of providing a broad viewing range, and thus is suitable for large-size display.

Figure 2:
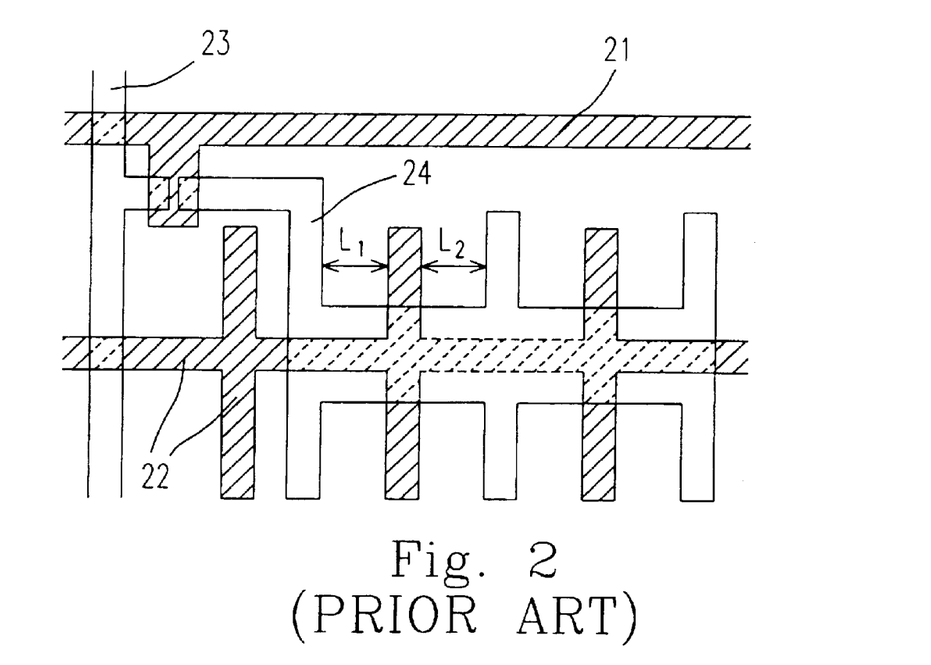
FIG. 2 is a top plane view of pixel regions of a conventional IPS-LCD.

A general in-plane switching mode TFTLCD is schematically shown in FIG. 2 which is a partial top plane view of the LCD structure. A conventional process for manufacturing the LCD structure principally includes the following steps:

(a) forming a first metal layer, and defining a gate conductive line 21 of TFT units and common electrodes 22 of display units;

(b) depositing a tri-layer structure which includes a gate isolation layer, a semiconductor layer, and an etch-stopper layer;

(c) defining an etch-stopper structure;

(d) forming a doped semiconductor layer, and defining source/drain regions of TFT units;

(e) forming a second metal layer, and defining a data line 23 of TFT units and data electrodes 24 of display units;

(f) depositing a passivation layer, and defining contact vias for interconnection; and (g) forming a transparent conductive layer, and defining transparent electrodes.

In the above conventional process, the common electrodes 22 and the data electrodes 24 are formed of the first and second metal layers by different photo-masking and lithography procedures, respectively. As known, for each photo-masking and lithography step, the risks of misalignment (i.e. L1≠L2 in FIG. 2) and contamination may be involved so as to affect the production yield. Further, the opaque feature of metal results in the reduction of light transmittance, and thus a relatively large clearance between each pair of data and common electrodes is required in order not to influence the overall light transmittance of the pixel region too much. The relatively large clearance, however, results in a relatively high operational voltage.

In order to solve these problems, a transparent conductive material substitutes for metal to form the common and data electrodes so as to enhance the light transmittance or allow the clearance to be reduced to a level less than the cell gap d. For example, indium tin oxide (ITO) can be used therefor. Nevertheless, the common and data electrodes are still defined by different photo-masking and lithography procedures, so the possibility of misalignment still exists. If such misalignment is desirably made to be tolerable, the compactness of the device cannot be achieved. Furthermore, the conductivity of the transparent conductive material is not good enough for electric conduction, so additional metal layers are required for forming the scan line and the data line. Thus the manufacturing process is even complicated.

SUMMARY OF THE INVENTION

Therefore, an object of the present invention is to provide a process for forming an in-plane switching mode liquid crystal display (IPS-LCD), which simultaneously defines pixel portions of the common and data electrodes so as to avoid misalignment.

Another object of the present invention is to provide a process for forming an in-plane switching mode liquid crystal display (IPS-LCD), which simultaneously defines the data line and the transparent pixel portions of the common and data electrodes so as to be relatively simple in manufacturing.

A further object of the present invention is to provide an in-plane switching mode liquid crystal display (IPS-LCD), in which a storage capacitor consisting of storage-capacitor portions of the common and data electrode structures is disposed outside the pixel region so as to enhance the aperture ratio of the pixel region.

The present invention relates to a process for forming an in-plane switching mode liquid crystal display (IPS-LCD), comprising steps of providing a substrate made of an insulating material; forming a first conductive layer on a first side of the substrate, and defining a gate conductive structure, and a bus portion of a common electrode; forming a tri-layer structure consisting of a gate insulation layer, a semiconductor layer, and an etch stopper layer; defining an etch stopper structure with a portion of the semiconductor layer exposed; forming a highly doped semiconductor layer, and defining a contact via for interconnection to the bus portion of the common electrode; forming a second conductive layer, and defining source/drain regions, a data line, a pixel portion of a data electrode, and a pixel portion of the common electrode with the etch stopper structure and the gate insulation layer as a stopper, wherein the pixel portion of the common electrode is interconnected to the bus portion of the common electrode through the contact via; and forming a passivation layer, and defining a pixel region for exposing the pixel portions of the data and common electrodes.

Preferably, a storage-capacitor portion of the common electrode is simultaneously defined together with the gate conductive line and the bus portion of the common electrode, and/or a storage-capacitor portion of the data electrode is simultaneously defined together with the source/drain regions, the data line, the pixel portions of the data and common electrodes. More preferably, a storage capacitor consisting of the storage-capacitor portion of the data electrode and the storage-capacitor portion of the common electrode is disposed between a boundary of the pixel region and the gate conductive line.

In an embodiment, pixel portions of the common and the data electrode structures are both of a comb shape, and arranged opposite to each other with alternate comb teeth.

Preferably, the first conductive layer is formed of chromium, molybdenum, tantalum molybdenum, tungsten molybdenum, tantalum, aluminum, aluminum silicide, copper, or a combination thereof. The insulation layer is formed of silicon nitride ($SiN_x$), silicon oxide ($SiO_x$), silicon oxynitride ($SiO_xN_y$), tantalum oxide ($TaO_x$), aluminum oxide ($AlO_x$), or a combination thereof. The etch stopper layer is formed of silicon nitride ($SiN_x$), silicon oxide ($SiO_x$) or silicon oxynitride ($SiO_xN_y$). The semiconductor layer is formed of intrinsic amorphous silicon, micro-crystalline silicon or polysilicon. The doped semiconductor layer is formed of highly doped amorphous silicon, highly doped micro-crystalline silicon or highly doped polysilicon. The passivation layer is formed of silicon nitride or silicon oxynitride. The insulating substrate is a light-transmitting glass.

In an embodiment, the second conductive layer is formed of a transparent material selected from indium tin oxide, indium zinc oxide and indium lead oxide. Alternatively, the second conductive layer is a composite layer including a transparent electrode layer and a metal layer overlying the transparent electrode layer. Preferably, a portion of the metal layer in the pixel region is removed after the data electrode and the pixel portion of the common electrode are exposed. The metal layer can be formed of chromium, molybdenum, tantalum molybdenum, tungsten molybdenum, tantalum, aluminum, aluminum silicide, copper, or a combination thereof. The transparent electrode layer can be formed of indium tin oxide, indium zinc oxide, or indium lead oxide.

Preferably, the step for defining the etch stopper structure includes sub-steps of forming a photoresist layer on the tri-layer structure; providing an exposing source from a second side of the substrate opposite to the first side by using a remaining portion of the first conductive layer as a shield to obtain an exposed area and an unexposed area; and removing the photoresist and the etch stopper layer of the exposed area so that the remaining portion of the etch stopper layer in the unexposed area has a specific shape substantially identical to the shape of the remaining portion of the first conductive layer, thereby exposing a portion of the semiconductor layer of the exposed area.

The present invention also relates to an in-plane switching mode liquid crystal display (IPS-LCD), comprising a first insulating substrate; a second insulating substrate; liquid crystal molecules sandwiched between the first and second insulating substrates; a thin film transistor (TFT) structure disposed on the first insulating substrate; a common electrode structure disposed at the first insulating substrate, and including a pixel portion and a storage-capacitor portion; a data electrode structure disposed on the first insulating substrate, electrically connected to a source electrode portion of the TFT structure, and including a pixel portion and a storage-capacitor portion; and a passivation structure overlying the TFT, common electrode and data electrode structures with a pixel aperture exposing the pixel portions of the common and data electrode structures; wherein a storage capacitor consisting of the storage-capacitor portions of the common and data electrode structures is disposed between a boundary of the pixel aperture and a gate conductive line of the TFT structure.

Preferably, the common electrode structure further includes a bus portion.

Preferably, the pixel portions of the common and data electrode structures are formed with the same transparent electrode layer formed of indium tin oxide, indium zinc oxide, or indium lead oxide.

Preferably, the pixel portions of the common and data electrode structures are formed with the same composite layer consisting of a transparent electrode layer and a metal layer. The metal layer can be formed of chromium, molybdenum, tantalum molybdenum, tungsten molybdenum, tantalum, aluminum, aluminum silicide, copper or a combination thereof. The transparent electrode layer can be formed of indium tin oxide, indium zinc oxide or indium lead oxide.

Preferably, the passivation structure is formed of silicon nitride and silicon oxynitride. The first and second insulating substrates are formed of light-transmitting glass.

Preferably, the pixel portions of the common and the data electrode structures are both of a comb shape, and arranged opposite to each other with alternate comb teeth.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following description of the preferred embodiment of this invention is presented herein for purpose of illustration and description only; it is not intended to be exhaustive or to be limited to the precise form disclosed.

Figure 3A:
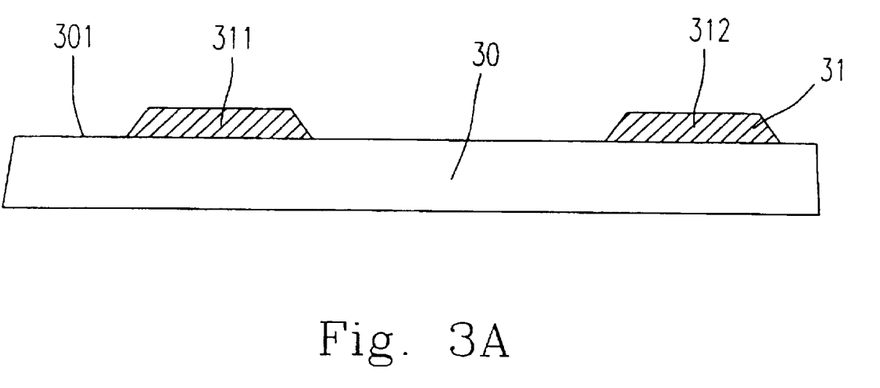
FIGS. 3A–3G are cross-sectional views of intermediate structures of an IPS-LCD according to the present invention, which schematically show a preferred embodiment of a process for forming a unit pixel region of the IPS-LCD.
Figure 3B:
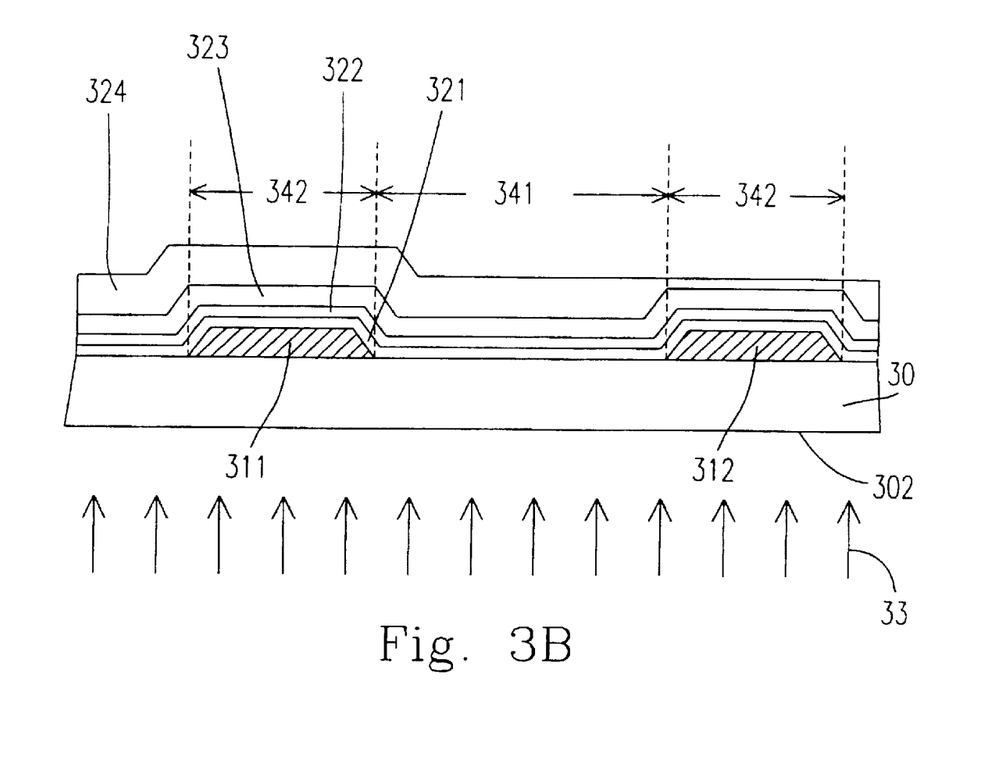
Figure 3C:
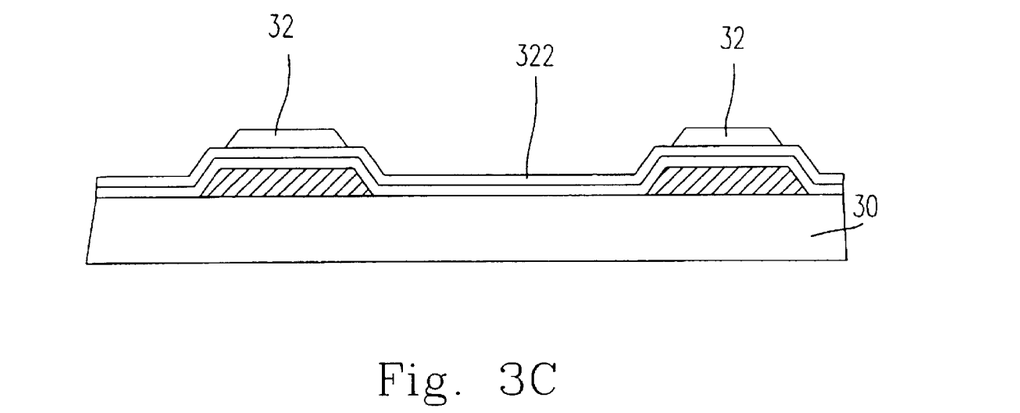
Figure 3D:
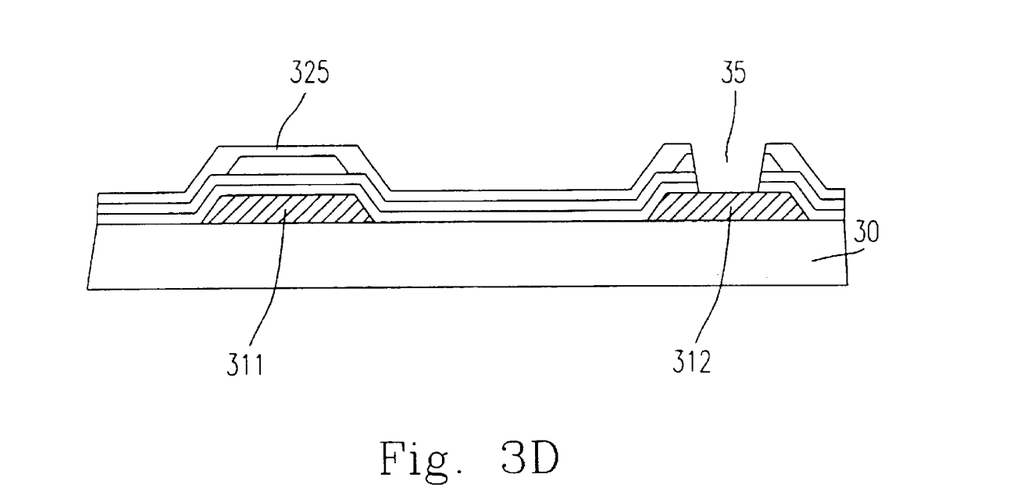
Figure 3E:
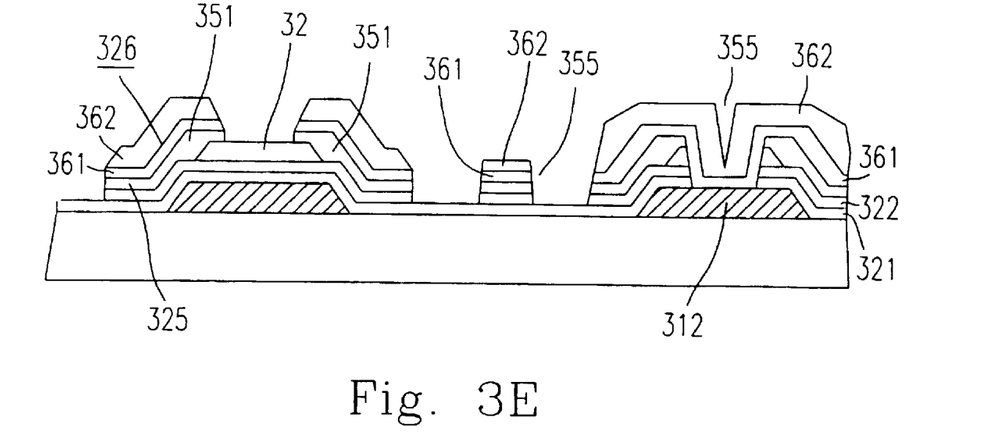
Figure 3F:
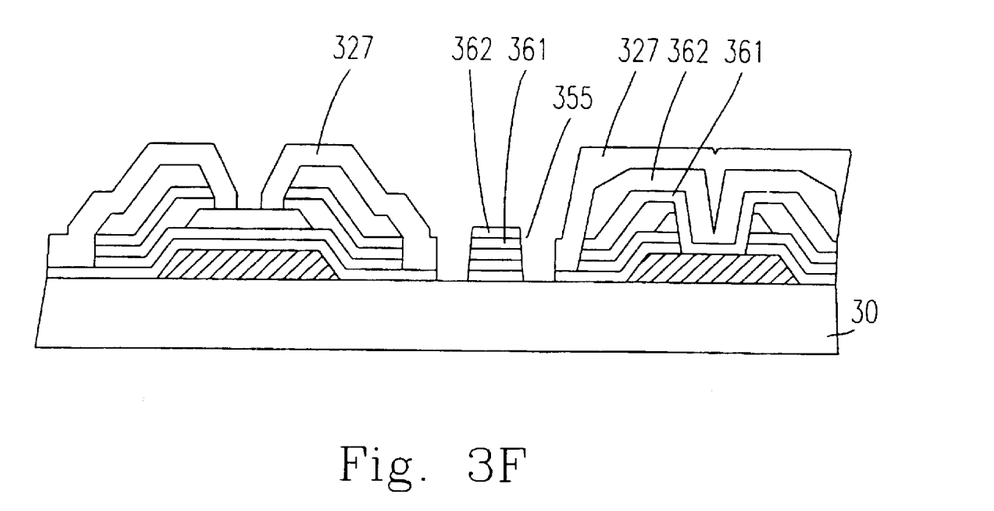
Figure 3G:
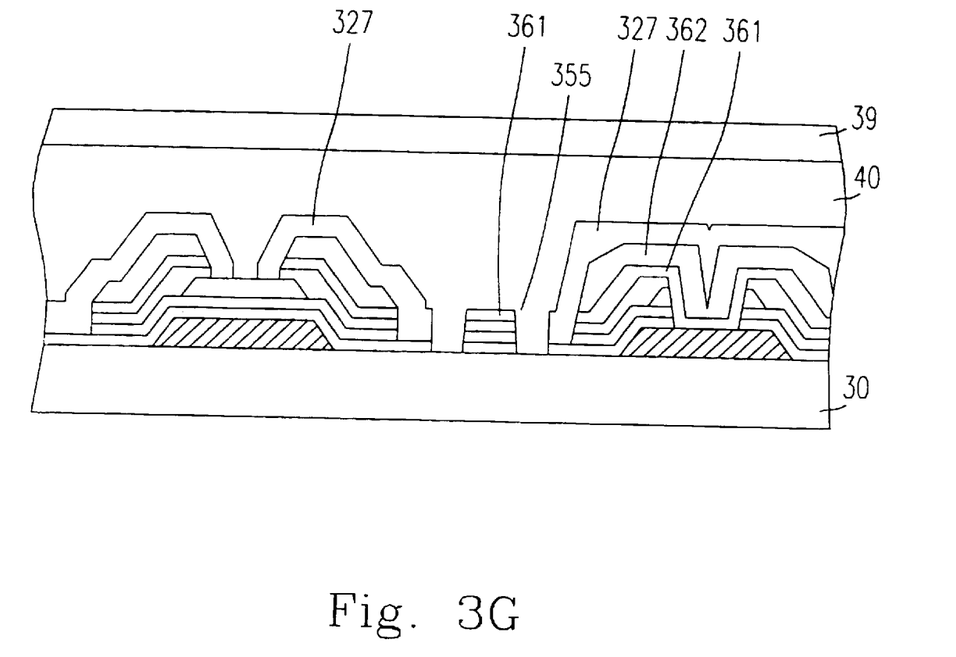
Figure 4A:
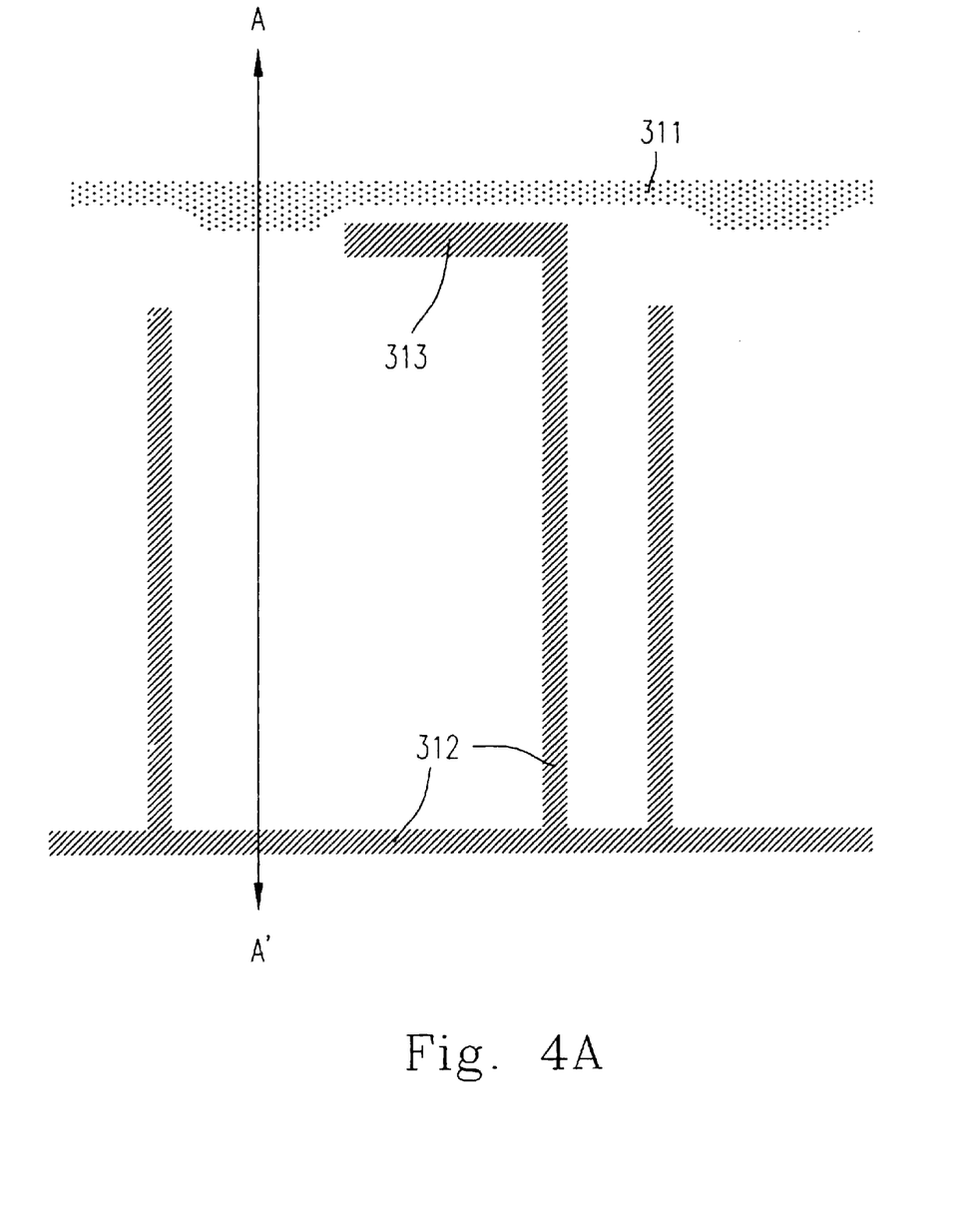
FIGS. 4A–4D are partial top plane views corresponding to the structures of FIGS. 3A, 3D, 3E and 3F, respectively.
Figure 4B:
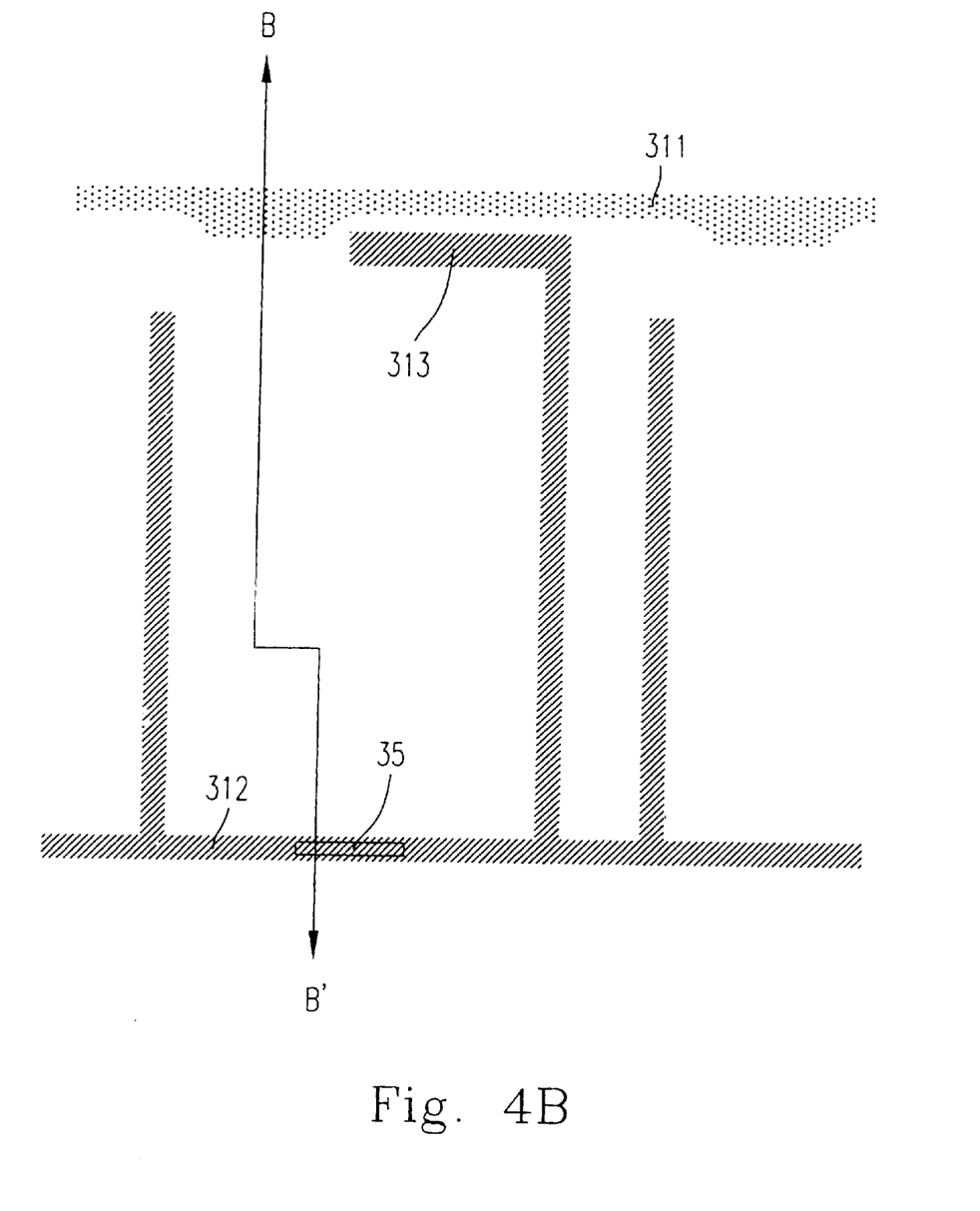
Figure 4C:
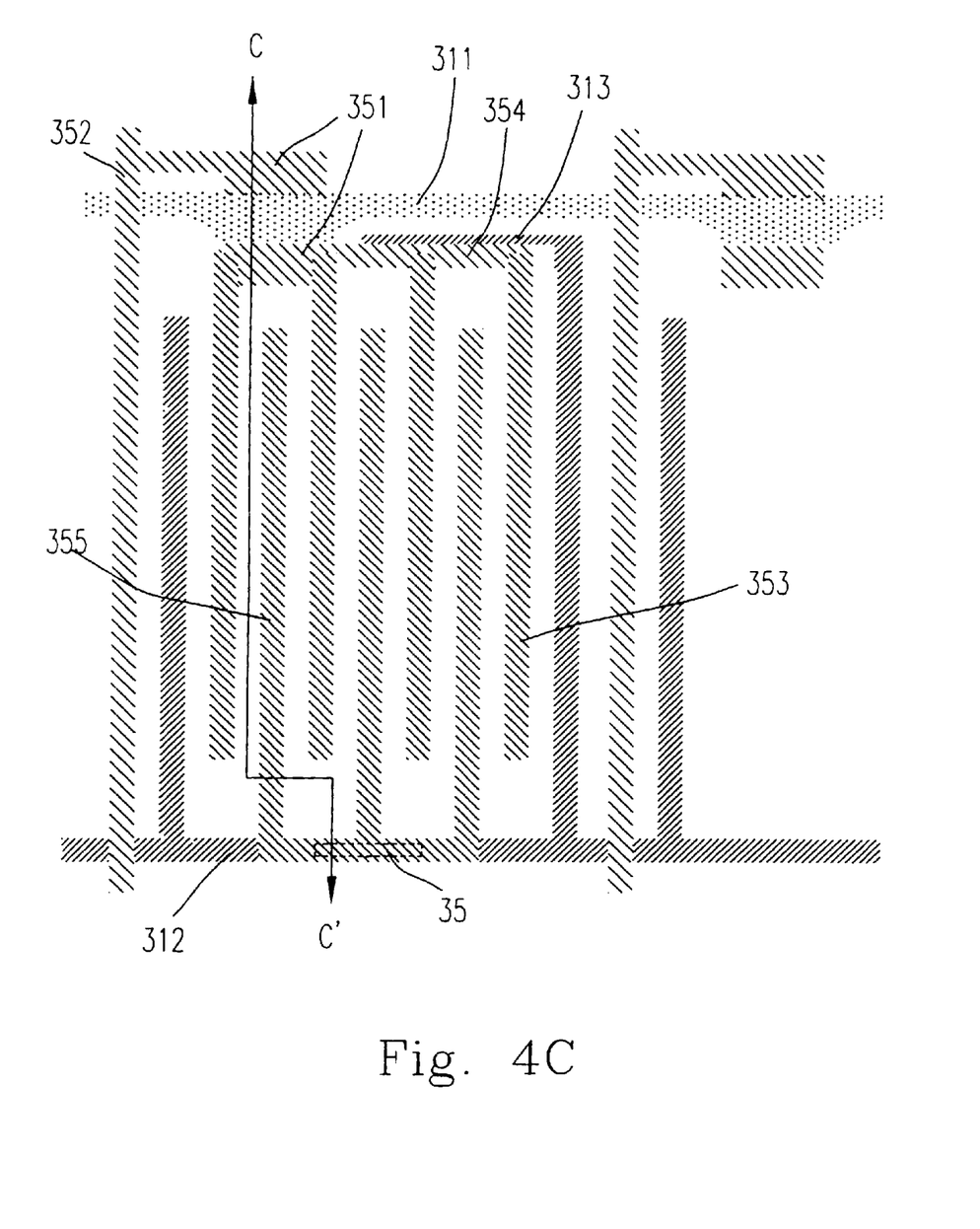
Figure 4D:
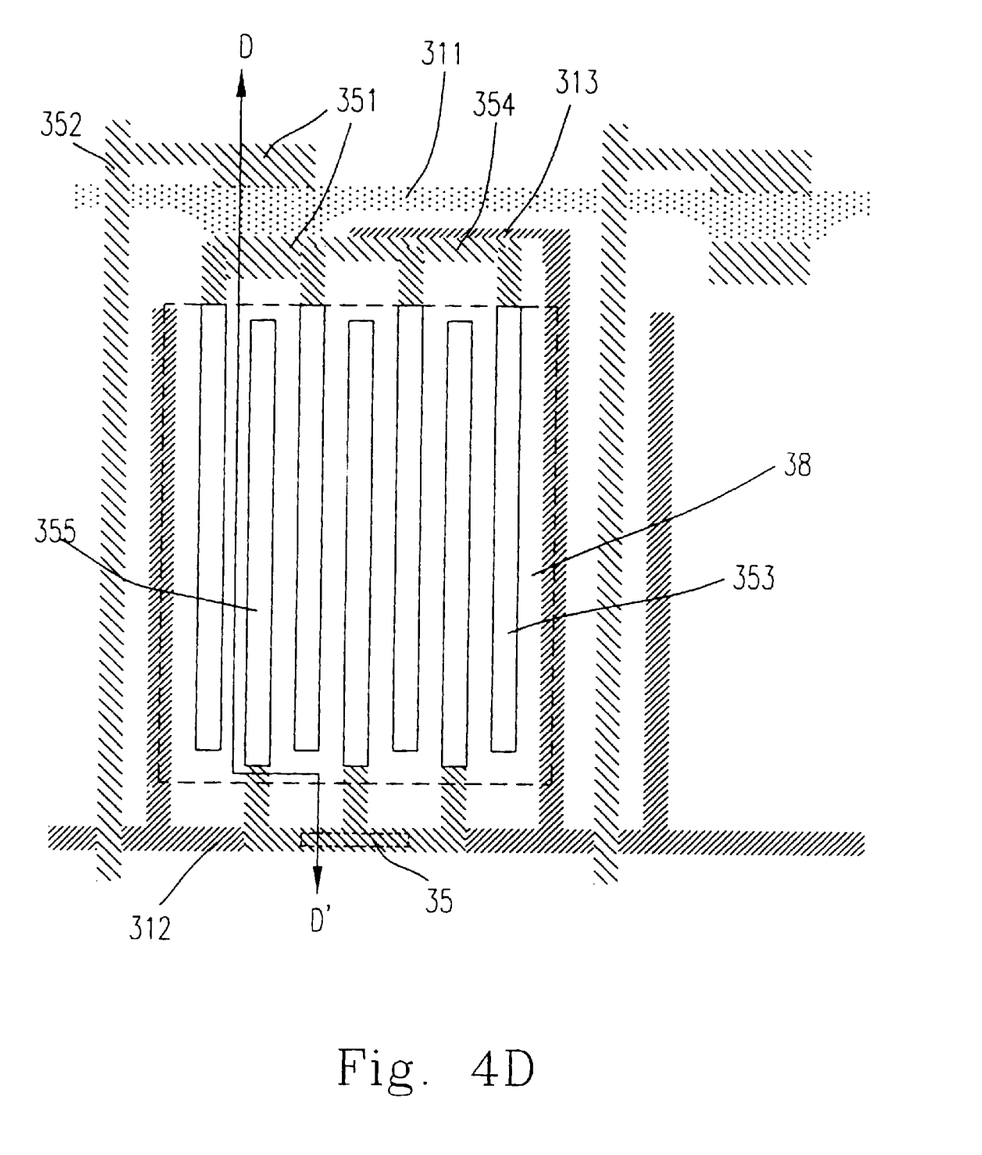

A preferred embodiment of a process for forming an IPS-LCD according to the present invention is illustrated with reference to FIGS. 3A–3G and 4A–4D. A substrate 30 made of an insulating material is provided, and formed on a first side 301 thereof a first conductive layer 31 which is further defined to form a gate conductive structure 311 including a TFT gate structure and a scan line, and a bus portion 312 and a storage-capacitor portion 313 of a common electrode, as shown in FIGS. 3A and 4A wherein FIG. 3A is a cross-sectional view taken along the A–A' line of FIG. 4A. A gate insulation layer 321, a semiconductor layer 322, and an etch stopper layer 323 are then successively applied to the resulting structure of FIG. 3A to form a tri-layer structure, as shown in FIG. 3B. On the tri-layer structure, a photoresist layer 324 is applied and exposed in order to define an etch stopper structure 32 shown in FIG. 3C. The exposure of the photoresist layer 324 is performed by providing an exposing source 33 from a second side 302 of the substrate 30 opposite to the first side 301 with the shield of the remaining portion of the first conductive layer 31. Therefore, the photoresist layer 324 includes an exposed area 341 and an ujnexposed area 342. Then, the photoresist layer 324 and subsequently the etch stopper layer 323 of the exposed area 341 are removed so that the remaining portion of the etch stopper layer 323 in the unexposed area 342 has a specific shape substantially identical to the shape of the remaining portion of the first conductive layer 31, as shown in FIG. 3C, which is referred as the etch stopper structure 32. With the removal of the overlying etch stopper layer 323 of the exposed area 341, a portion of the semiconductor layer 322 of the exposed area 341 is exposed. The remaining photoresist layer 324 is also removed. Afterwards, a highly doped semiconductor layer 325 is applied on the resulting structure of FIG. 3C, and a contact via 35 is defined, as shown in FIGS. 3D and 4B wherein FIG. 3D is a cross-sectional view taken along the B–B' line of FIG. 4B. The contact via 35 allows the interconnection to the bus portion 312 of the common electrode. Subsequently, a second conductive layer 326 consisting of a transparent electrode layer 361 and a metal layer 362 is applied to the resulting structure of FIG. 3D, and patterned to define source/drain regions 351, a data line 352, a pixel portion 353 of a data electrode, a storage-capacitor portion 354 of the data electrode, and a pixel portion 355 of the common electrode with the shield of the etch stopper structure 32 and the gate insulation layer 321, as shown in FIGS. 3E and 4C wherein FIG. 3E is a cross-sectional view taken along the C–C' line of FIG. 4C. As shown, the pixel portion 355 of the common electrode is interconnected to the bus portion 312 of the common electrode through the contact via 35. Over the resulting structure of FIG. 3E, a passivation layer 327 is applied to protect the circuit, and it is patterned to define a pixel region 38, thereby exposing the pixel portions 353 and 355 of the data and common electrodes, respectively, as shown in FIG. 3F. Pad regions (not shown) around the matrix for interconnection to scan and data lines are simultaneously defined in this step. Then, the metal layer 362 in the pixel region 38 is removed to make the pixel region 38 transparent, as shown in FIGS. 3G and 4D wherein FIG. 3G is a cross-sectional view taken along the D–D' line of FIG. 4D. The manufacturing of the IPS-LCD is completed by filling liquid crystal molecules 40 between an upper substrate 39 and the substrate 30 having thereon the above-mentioned structures.

In the above embodiment, the insulating substrates 30 and 39 can be light-transmitting glass plates. The first conductive layer 31 can be formed of chromium, molybdenum, tantalum molybdenum, tungsten molybdenum, tantalum, aluminum, aluminum silicide, copper, or a combination thereof. The insulation layer 321 can be formed of silicon nitride ($SiN_x$), silicon oxide ($SiO_x$), silicon oxynitride ($SiO_xN_y$), tantalum oxide ($TaO_x$), aluminum oxide ($AlO_x$), or a combination thereof. Preferably, there exists a high etching selectivity between the etching stopper layer 323 and the semiconductor layer 322 for respective etching gases. For example, the semiconductor layer 322 is formed of intrinsic amorphous silicon, micro-crystalline silicon or polysilicon. The etch stopper layer 323 is formed of silicon nitride ($SiN_x$), silicon oxide ($SiO_x$) or silicon oxynitride ($SiO_xN_y$). An etching gas for the semiconductor layer or the etching stopper layer can be selected from a group consisting of carbon tetrafluoride ($CF_4$), boron trichloride ($BCl_3$), chlorine ($Cl_2$), sulfur hexafluoride ($SF_6$), and a mixture thereof. The doped semiconductor layer 325 can be formed of highly doped amorphous silicon, highly doped micro-crystalline silicon or highly doped polysilicon. The transparent electrode layer 361 can be formed of indium tin oxide, indium zinc oxide, or indium lead oxide. The metal layer 362 can be formed of chromium, molybdenum, tantalum molybdenum, tungsten molybdenum, tantalum, aluminum, aluminum silicide, copper, or a combination thereof. The passivation layer 327 can be formed of silicon nitride or silicon oxynitride.

According to the present invention, the second conductive layer 326 is a composite layer consisting of a transparent electrode layer and a metal layer to assure of good light transttance and electric conduction for the pixel region and the conductive lines, respectively, at the same time. By removing the opaque metal layer in the pixel region with the transparent electrode layer left, the aperture ratio is improved. Therefore, if required, the clearance between the common and data electrodes can be reduced to a level less than the cell gap, e.g. 2 to 5 microns. Of course, a single transparent electrode layer can be used as the second conductive layer in the pixel region 38, and an additional metal layer is applied to form the conductive lines by another step.

In addition, according to the present invention, the pixel portions 353 and 355 of the common and data electrodes are simultaneously defined so as to avoid misalignment between the common and data electrodes, and thus avoid uneven light transmittance.

Furthermore, according to the present invention, the storage capacitor consisting the storage capacitors 313 and 354 of the common and data electrodes is arranged between a boundary of the pixel region 38 and the gate conductive line 311, so the space is well utilized to further improve the aperture ratio.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A process for forming an in-plane switching mode liquid crystal display (IPS-LCD), comprising steps of:
   providing a substrate made of an insulating material;
   forming a first conductive layer on a first side of said substrate, and defining a gate conductive structure, and a bus portion of a common electrode;
   forming a tri-layer structure consisting of a gate insulation layer, a semiconductor layer, and an etch stopper layer;
   defining an etch stopper structure with a portion of said semiconductor layer exposed;
   forming a highly doped semiconductor layer, and defining a contact via for interconnection to said bus portion of said common electrode;
   forming a second conductive layer made of a material selected from a group consisting of indium tin oxide, indium zinc oxide and indium lead oxide, and defining source/drain regions, a data line, a pixel portion of a data electrode, and a pixel portion of said common electrode with said etch stopper structure and said gate insulation layer as a stopper, wherein said pixel portion of said common electrode is interconnected to said bus portion of said common electrode through said contact via; and
   forming a passivation layer, and defining a pixel region for exposing said pixel portions of said data and common electrodes.

2. The process according to claim 1 wherein a storage-capacitor portion of said common electrode is simultaneously defined together with said gate conductive structure and said bus portion of said common electrode.

3. The process according to claim 2 wherein a storage-capacitor portion of said data electrode is simultaneously defined together with said source/drain regions, said data line, said pixel portions of said data and common electrodes.

4. The process according to claim 3 wherein a storage capacitor consisting of said storage-capacitor portion of said data electrode and said storage-capacitor portion of said common electrode is disposed between a boundary of said pixel region and said gate conductive structure.

5. The process according to claim 1 wherein said pixel portions of said common and said data electrode structures are both of a comb shape, and arranged opposite to each other with alternate comb teeth.

6. The process according to claim 1 wherein said first conductive layer is formed of a material selected from a group consisting of chromium, molybdenum, tantalum molybdenum, tungsten molybdenum, tantalum, aluminum, aluminum silicide, copper and a combination thereof.

7. The process according to claim 1 wherein said gate insulation layer is formed of a material selected from a group consisting of silicon nitride ($SiN_x$), silicon oxide ($SiO_x$), silicon oxynitride ($SiO_xN_y$) tantalum oxide ($TaO_x$), aluminum oxide ($AlO_x$), and a combination thereof.

8. The process according to claim 1 wherein said etch stopper layer is formed of a material selected from a group consisting of silicon nitride ($SiN_x$), silicon oxide ($SiO_x$) and silicon oxynitride ($SiO_xN_y$).

9. The process according to claim 1 wherein said semiconductor layer is formed of a material selected from a group consisting of intrinsic amorphous silicon, micro-crystalline silicon and polysilicon.

10. The process according to claim 1 wherein said doped semiconductor layer is formed of a material selected from a group consisting of highly doped amorphous silicon, highly doped micro-crystalline silicon and highly doped polysilicon.

11. The process according to claim 1 wherein said passivation layer is formed of a material selected from a group consisting of silicon nitride and silicon oxynitride.

12. The process according to claim 1 wherein said insulating substrate is a light-transmitting glass.

* * * * *